United States Patent
Pechstein et al.

(10) Patent No.: US 11,619,525 B2
(45) Date of Patent: Apr. 4, 2023

(54) SENSOR MOUNTING, SENSOR AND SENSOR ARRANGEMENT

(71) Applicant: Endress+Hauser Conducta GmbH+Co. KG, Gerlingen (DE)

(72) Inventors: Torsten Pechstein, Radebeul (DE); Stefan Pilz, Geithain (DE); Sebastian Geissler, Geithain (DE); Thomas Pfauch, Leipzig (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 373 days.

(21) Appl. No.: 16/710,706

(22) Filed: Dec. 11, 2019

(65) Prior Publication Data

US 2020/0191617 A1     Jun. 18, 2020

(30) Foreign Application Priority Data

Dec. 12, 2018 (DE) .................. 10 2018 131 936.3

(51) Int. Cl.
   *G01D 11/24*     (2006.01)
   *G01D 11/30*     (2006.01)

(52) U.S. Cl.
   CPC ........... *G01D 11/245* (2013.01); *G01D 11/30* (2013.01)

(58) Field of Classification Search
   CPC ............................ G01D 11/245; G01D 11/30
   See application file for complete search history.

(56) References Cited

U.S. PATENT DOCUMENTS

| | | | |
|---|---|---|---|
| 8,583,382 B1 * | 11/2013 | Loase | G01L 5/008 |
| | | | 702/41 |
| 2005/0022581 A1 * | 2/2005 | Sunshine | G01N 29/022 |
| | | | 73/31.05 |
| 2019/0056047 A1 * | 2/2019 | Staton | F16M 11/40 |
| 2019/0350475 A1 * | 11/2019 | Dietz | A61B 5/0532 |
| 2021/0222809 A1 * | 7/2021 | Chung | B64C 1/26 |

FOREIGN PATENT DOCUMENTS

| | | |
|---|---|---|
| CN | 2901455 Y | 5/2007 |
| CN | 201297922 Y | 8/2009 |
| CN | 102735278 A | 10/2012 |
| CN | 102778243 A | 11/2012 |
| CN | 103217181 A | 7/2013 |
| CN | 104280518 A | 1/2015 |
| CN | 105264364 A | 1/2016 |
| CN | 205352470 U * | 6/2016 |
| CN | 107478952 A | 12/2017 |
| CN | 107621277 A | 1/2018 |
| DE | 10352159 A1 | 12/2004 |
| DE | 102017116504 A1 | 1/2019 |
| JP | 6298327 B2 | 3/2018 |

* cited by examiner

*Primary Examiner* — Jamel E Williams
(74) *Attorney, Agent, or Firm* — Kelly J. Smith; Endress+Hauser (USA) Holding, Inc.

(57) ABSTRACT

The present disclosure relates to a sensor and sensor mounting comprising a housing having an end section, wherein the end section is designed for mounting of the sensor. First communication capabilities are arranged in the housing and are designed for the wireless transmission of power to the sensor and for the wireless transmission and reception of data to and from the sensor. First retaining capabilities are designed to hold the sensor in the end section, and connecting capabilities, which are connected at least to the communication capabilities, are designed to connect the sensor mounting to a superordinate unit.

20 Claims, 4 Drawing Sheets

SENSOR MOUNTING, SENSOR AND SENSOR ARRANGEMENT

CROSS-REFERENCE TO RELATED APPLICATION

The present application is related to and claims the priority benefit of German Patent Application No. 10 2018 131 936.3, filed on Dec. 12, 2018, the entire contents of which are incorporated herein by reference.

TECHNICAL FIELD

The present disclosure relates to a sensor mounting, a sensor, and a sensor arrangement comprising the same.

BACKGROUND

In process metrology (process automation), sensors for measuring process state variables or material quality variables are instrumented in process engineering processes. Depending on the parameter and type of sensor, it is necessary for operating or maintenance personnel to clean the sensor at regular intervals or to perform a service. For example, a pH sensor must be regularly calibrated, or a membrane cap must be replaced in the event of an oxygen sensor; in general, the replacement of components is necessary. Typical intervals for analysis parameters are weekly to monthly.

Typical installation locations of such sensors are containers, pipelines, or gutters. Typical installation situations in water and wastewater management are gutters or open basins. A typical application in wastewater management is sewage treatment plants. In sewage treatment plants, there is an increased risk of infection, for example by viruses or bacteria.

In order to mechanically affix the sensors and also to protect them against mechanical effects, the sensors are mounted in immersion assemblies. The immersion assembly itself has means for fastening. Immersion assemblies are preferably made of metal or plastic. A typical assembly from the applicant is distributed under the name "Flexdip CYA112." Further generic assemblies are the immersion assemblies of Mettler-Toledo, the process immersion assemblies of Jumo, or the "ARD 220" immersion assembly from Knick. The assembly is thus most often a cylindrical hollow body with openings for a cable and supply lines for media at both ends.

For purposes of power supply and data transmission, the sensors themselves are connected with a cable which is detachable or not detachable from the sensor. In order to instrument the sensor in a typical water/wastewater application, the assembly must be affixed, the cable threaded through the assembly, and the cable fitted to the sensor and to a measuring transducer. The cable passes through a first opening of the assembly to a measuring transducer. The cable reaches the sensor from a second opening. Finally, the assembly comprises a capability of being connected to the sensor, which is designed in such a way that, in the assembled state, a connection is created that is to be assessed as fluid-tight by the person skilled in the art.

The assembly is therefore only sealed with the sensor installed. Without a sensor, the interior of the assembly can become contaminated. If the sensor is not installed correctly in the assembly, liquid can penetrate into the assembly and contaminate the interior of the assembly. A feedback as to whether the sensor is securely and correctly installed in the assembly is usually not present. If necessary, this entails further tests before the assembly with the sensor is released back into the basin.

To exchange a cable, the entire measuring point must be dismantled in a complicated manner. Also, to exchange a sensor with a fixed cable, meaning that sensor and cable form one unit, the entire measuring point must be dismantled in a complicated manner. In order to install and remove a sensor in the assembly, under the circumstances the cable may need to be bent in order to bring it into/out of the assembly. The insertion of the cable is difficult, particularly if the assembly has a bend. The cable twists and the cable is twisted within the assembly. This can damage the cable or cause it to wear more quickly.

In sewage treatment plants, the required maintenance of the sensors requires manual handling of the assemblies and sensors contaminated with wastewater. The cleaning of sensor and assembly is complex due to the complicated design of the transition from the sensor to the assembly.

For a tight cable screw fitting at the measuring transducer-side end of the assembly, many individual parts need to be installed.

SUMMARY

The present disclosure is based on the object of ensuring a simple and secure configuration, installation, and maintenance of a measuring point while minimizing human contact with contaminated plant parts.

The object is achieved by a sensor mounting comprising: a housing having an end section, such as a pot-like end section, wherein the end section is designed for mounting of a sensor; a first communication means which are arranged in the housing, wherein the communication means are designed for the wireless transmission of power to the sensor and for the wireless transmission and reception of data to and from the sensor; first retaining means designed to hold the sensor in the end section; and connecting means which are connected at least to the communication means and are designed to connect the sensor mounting to a superordinate unit.

Manual handling of a soiled armature is thereby greatly reduced, and the risk of infection is decreased. In general, easy cleanability is achieved. This further results in a safer and more reliable measuring point operation and a simpler installation of the measuring point.

A further advantage can be seen in the fact that no liquid can penetrate into the interior, that is to say where the electronics are arranged, in the sensor mounting without a sensor being mounted, or with an incorrectly mounted sensor.

In the context of this application, "pot-like" or "pot-like end section" is to be understood as an end section of the sensor mounting having an opening into which the sensor can be introduced or by which the sensor can be accommodated. In one embodiment, this opening is circular; quadrangular, such as square; hexagonal; or octagonal. In general, the opening is n-sided. The opening extends along the main axis of the sensor mounting. On the side opposite the opening, the end section includes a bottom. The opening is thus designed as a straight cylinder with bottom, or as a straight prism with bottom, in a special instance as a cuboid. The bottom serves as a stop for the inserted sensor. The end section has a wall which, when the sensor is inserted, runs substantially parallel to the sensor housing. In other words, the opening with the wall is constructed complementary to the sensor housing.

One embodiment provides for the communication means to be designed as a communication interface.

One embodiment provides for the first communication means to be designed as an inductive, capacitive, or optical interface.

One embodiment provides for the connecting means to be arranged in the housing, at least in some sections.

One embodiment provides for the connecting means to be designed as cables and to be a fixed component of the sensor mounting. The threading of cables into and through the sensor mounting is eliminated. The connecting means are thus to be understood as an "external" interface, thus as a measuring transducer, for example.

One embodiment provides for the first retaining means to be arranged in the housing.

The sensor is held in the sensor mounting by the retaining means; that is, the sensor is inserted on or into the sensor mounting and remains there by means of the retaining means. A certain force must be applied in order to remove the sensor located in or on the sensor mounting again. In this way, the retaining means ensure that the sensor does not detach from the sensor mounting accidentally or due to lighter mechanical influences (such as medium or a smaller part flowing past the sensor).

One embodiment provides for the first retaining means to be designed as a permanent magnet.

One embodiment provides for the first retaining means to comprise a cutoff device, such as a hinge, claim coupling, lever, or bayonet, which is arranged in the region of the open end of the end section.

One embodiment provides for a first data processing unit comprising a microcontroller and a memory, wherein the data processing unit is arranged in the housing and is designed to process the data, and, particularly, for example, to process, compute and convert measured values of a connected sensor and to transmit these to the superordinate unit, and to receive and process data from the superordinate unit.

One embodiment provides for the sensor mounting to comprise a wireless module, such as a Bluetooth or NFC or Wifi or IR module, wherein the wireless module is arranged in the housing and is designed for communication with an operating device, such as a mobile device.

One embodiment provides for the first data processing unit to be designed to process sensor mounting-specific, measuring point-specific, or sensor-specific data.

One embodiment provides for the sensor mounting to comprise a fastening fixture with which the sensor mounting is fastened, such as, for example, to a conduit, basin, container, boiler, tube, pipeline, railing etc.

One embodiment provides for at least one first indicator device, such as an indicator lamp, to comprise an LED or a display, wherein the indicator device is designed to indicate a state of the sensor mounting, a connected sensor, a connection of sensor and sensor mounting, a measured value of a connected sensor etc.

One embodiment provides for surfaces and edges of the housing which can be brought into contact with a medium, including all surfaces and edges, to have a smooth and rounded design. The medium to be sealed can thus drain out. Any present surfaces and edges are flattened radially outward.

In one form of a development, the sleeves connected to the housing in the first end region and/or in the second end region are re-machined, such as to be rounded. Thus, the conductivity sensor produced with the method satisfies subsequent hygienic requirements. Any present cavities, corners, and edges are removed, and the resulting body is burr-free.

One embodiment provides for the housing to be designed as one piece.

One embodiment provides for the inner diameter of the end section to be at least 12 mm, such as at least 25 mm or at least 40 mm.

The object is further achieved by a sensor comprising: a sensor housing; a second retaining means that have a design complementary to the first retaining means, and which holds the sensor in a pot-like end section of a sensor mounting; a second communication means which are arranged in the sensor housing and has a design complementary to the first communication means, wherein the second communication means are designed for the wireless reception of power from the sensor mounting and for the wireless transmission and reception of data to and from the sensor mounting; at least one sensor element for measuring at least one measured variable; and a second data processing unit, comprising a memory, that is arranged in the sensor housing, wherein the second data processing unit is designed at least to transmit a value dependent on the measured variable via the second communication means, or to receive data.

One embodiment provides for surfaces and edges of the sensor which can be brought into contact with a medium to have a smooth and rounded design.

One embodiment provides for the second retaining means to be arranged in the sensor housing.

One embodiment provides for the sensor to comprise at least one second indicator device, such as an LED, wherein the second indicator device is designed to indicate a state of a connected sensor mounting, of the sensor, of a connection between the sensor and the sensor mounting, of a measured value etc.

One embodiment provides for the sensor to comprise a wireless module, such as Bluetooth or NFC or Wifi or IR module. This wireless module is arranged in the housing of the sensor. In one embodiment, this wireless module is designed for communication with an operating device, such as a mobile device. In one embodiment, this wireless module is designed for communication with the wireless module of the sensor mounting.

One embodiment provides for the sensor element to be designed for measuring oxygen, such as dissolved oxygen; pH value; conductivity etc.

BRIEF DESCRIPTION OF THE DRAWINGS

The object is further achieved by an assembly arrangement comprising a sensor mounting and a sensor as described above.

This will be explained in more detail with reference to the following Figures.

DETAILED DESCRIPTION

Figure 1A:
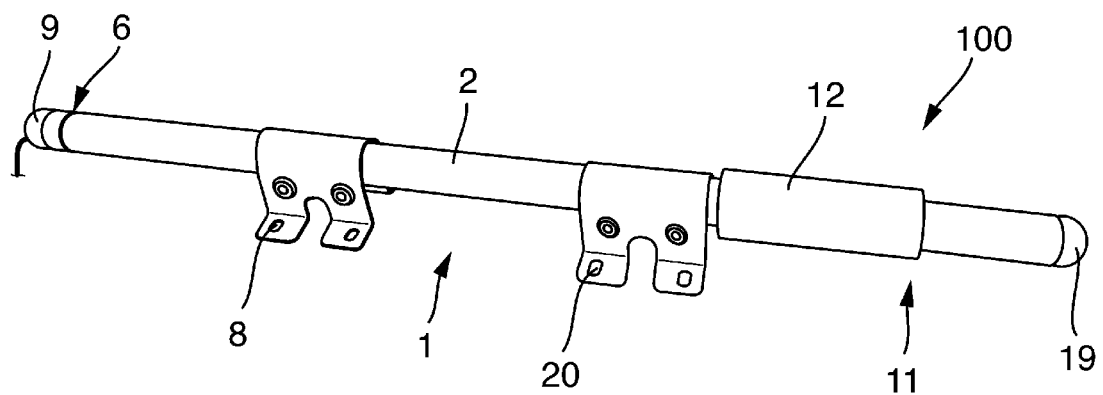
FIG. 1a shows the claimed assembly arrangement in the assembled state.

In Figures, the same features are identified with the same reference characters.

The entirety of the claimed assembly arrangement is denoted by reference character 1 and is shown in FIG. 1*a*.

Figure 1B:
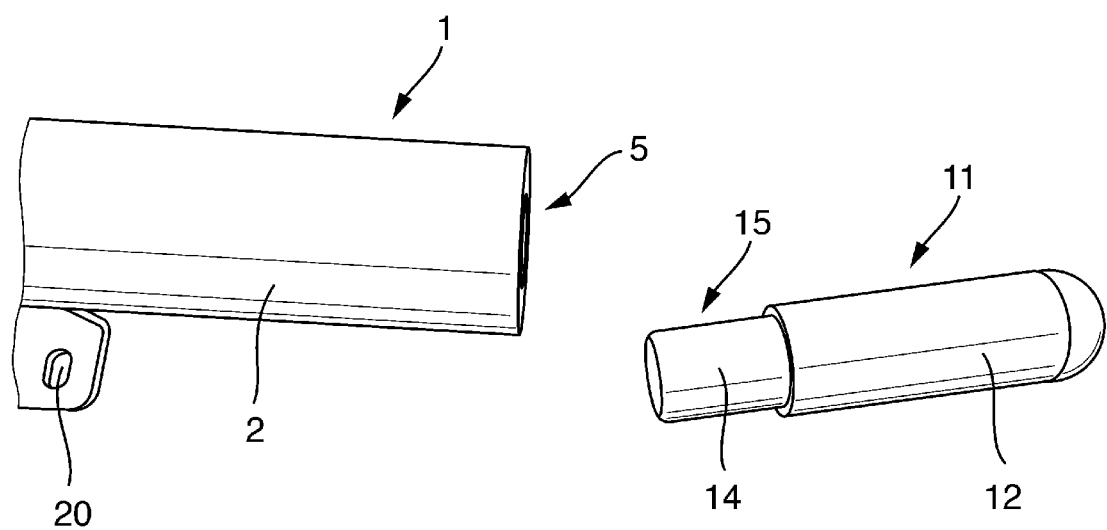
FIG. 1b shows the claimed assembly arrangement in the separated state.

The assembly arrangement 100 comprises two parts: the sensor mounting 1 and the sensor 11. FIG. 1*a* shows the assembled state, and FIG. 1*b* shows the disassembled state. Both parts are substantially cylindrical in shape. The sensor mounting 1 or the sensor 11 are made of stainless steel or a durable plastic such as polyvinyl chloride (PVC), polyoxymethylene (POM) or polyetheretherketone (PEEK). The length of the entire assembly arrangement 100 is 500 mm to 3000 mm, for example 1500 mm. The length of the shaft of the sensor 11 is 100 mm to 500 mm, for example 120 mm, 150 mm, 225 mm or 360 mm. The diameter of the sensor 11 is for example 12 mm, 25 mm or 40 mm.

The assembly arrangement 100 and the sensor 11 are designed for immersion in a medium to be measured.

The assembly arrangement 100 is fastened to a container, basin, pipe etc. via a fastening fixture 8. The fastening fixture 8 comprises screws, nuts, corresponding linkages, and mountings, for example. The mountings serve to connect the individual pipes and are designed as cross-clamps, for example. The fitting arrangement 100 can be fixed vertically by means of a stand or horizontally at the top of the wall of the pool edge. In one configuration, the fitting arrangement 100 is attached to a railing bracket attached to the pool edge.

The sensor mounting 1 comprises a housing 2. Surfaces and edges of the housing 2 which can be brought into contact with a medium have a smooth and rounded design. Embodiments having one or more edges are also possible. In one embodiment, the housing 2 has a one-piece design. Of course, embodiments in which the housing 2 consists of two or more parts are also possible.

Figure 2:
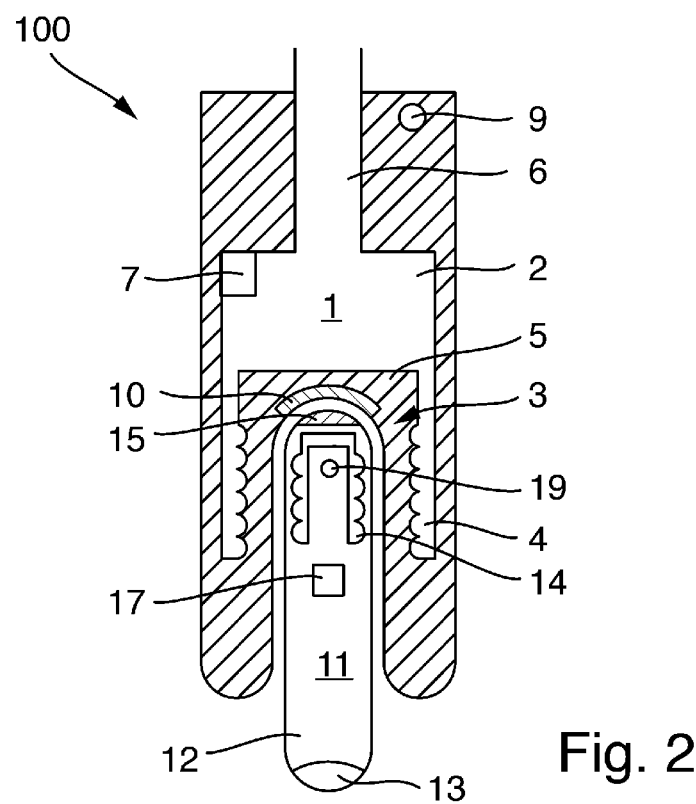
FIG. 2 shows the claimed assembly arrangement in cross section in a first embodiment.
Figure 3:
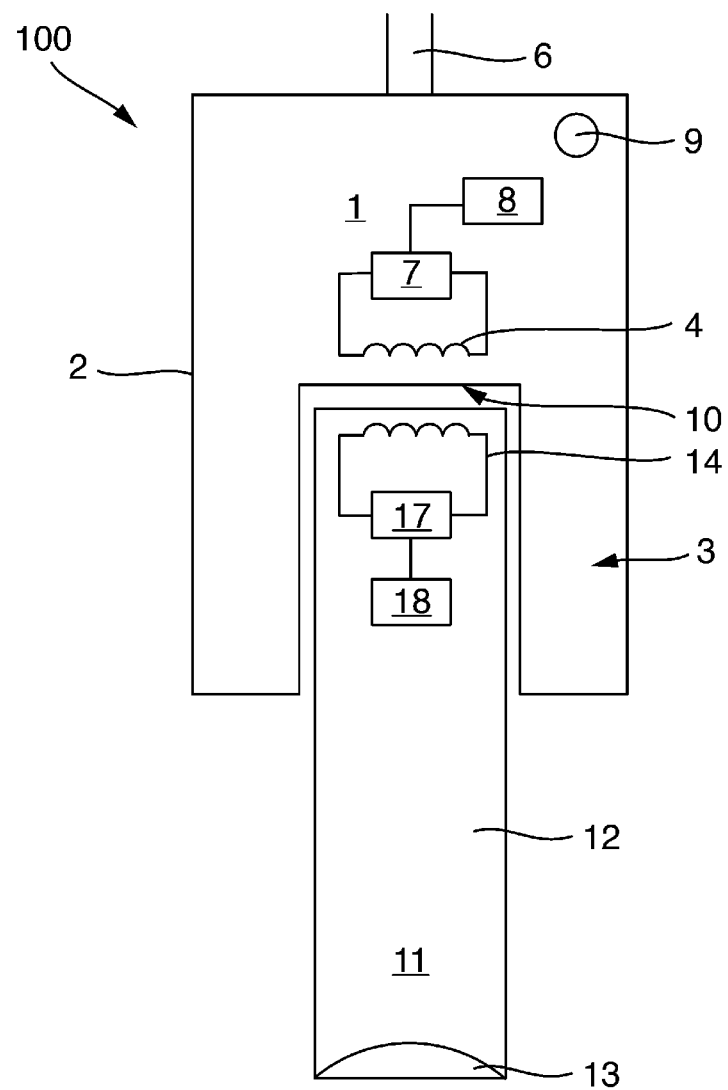
FIG. 3 shows the claimed assembly arrangement in a partial diagrammatic view in a second embodiment.
Figure 4:
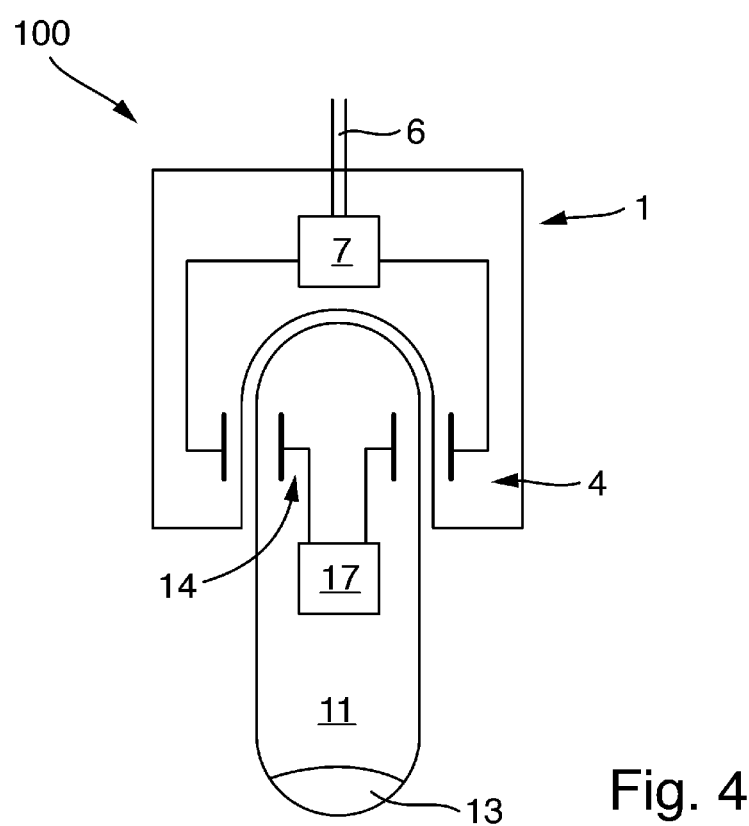
FIG. 4 shows the claimed assembly arrangement in a partial diagrammatic view in a third embodiment.

The housing 2 has an end section 3 (shown in FIGS. 2-4) designed to accommodate the sensor 11. The end section 3 is pot-like. The pot-like section 3 has an opening which is circular, for example. The end section 3 thus corresponds to a straight cylinder that is open on one side and has a bottom. The housing 12 of the sensor 11 has an outer contour corresponding to the inner part of the end section 3. The inner diameter of the pot-like end section 3 is at least 12 mm, at least 25 mm, or at least 40 mm. The sensor 11 is inserted into the opening. The end section 3 comprises a bottom 10 (shown in FIGS. 2 and 3) which serves as a stop for the sensor 11. In the example in FIG. 3, the bottom 10 is straight, the end section 3 is as mentioned a straight cylinder, and the sensor 11 to be introduced is also straight and substantially cylindrical. The pot-like section 3 has a depth of for example 100 mm to 150 mm. The examples in FIG. 2 and FIG. 4 show the bottom 10 as a curved surface, for example hemispherical. The end section 3 and the sensor 5 are designed accordingly.

The sensor mounting 1 comprises connecting means 6 at the end opposite the end section 3. Communication takes place via the connecting means 6 to a superordinate unit (not shown), for instance a control system or a transmitter. The connecting means 6 are designed as cables, for example. The cable is a fixed component of the sensor mounting 1. This is preinstalled by the manufacturer in the sensor mounting 1. The connecting means 6 are arranged in the housing 2, at least in some sections. The assembly arrangement 100 is supplied with power via the connecting means 6.

The sensor mounting 1 comprises an indicator device 9, for example one or more LEDs, a display, or the like. An acoustic representation is also possible. The state of the sensor mounting 1, a connected sensor 11, a connection of sensor 11 and sensor mounting 1, or a measured value of a connected sensor 11 can be indicated (for example via a warning sound) via the indicator device 9. The indicator device 9 is arranged, for example, in the vicinity of the connecting means 9.

The sensor 11 also comprises an indicator device, denoted here by reference character 19. A state of the connected sensor mounting 1, of the sensor 11 itself, of a connection of sensor 11 and sensor mounting 1, of a measured value inter alia can be indicated via the indicator device 19. The indicator device 19 comprises, for example, one or more LEDs, a display, or the like. The indicator device 19 can, for example, be arranged on the side of the sensor 11 on which the sensor 11 is mounted in the sensor mounting 1.

The sensor 1 comprises a sensor element 13 (see FIG. 2) for detecting a process variable to be determined, such as the pH value, conductivity, oxygen, nitrate, nitride, turbidity etc. In general, the process variable is a process variable of process automation technology.

The sensor 11 comprises a data processing unit 17 which calculates a measured value dependent on the process variable, for example. For this purpose, the data processing unit 17 also comprises one or more memories in which calibration values are stored, for example. The sensor 11 communicates with the sensor mounting 1 (see below) via the data processing unit 17 or the data processing unit 7 of the sensor mounting 1. Raw data of the measurement can also be sent to the sensor mounting 1. These raw data are then converted into the actual measured value in the sensor mounting 1.

The sensor mounting 1 or its housing 2 comprises first retaining means 5 which are designed to hold the sensor 11 in the pot-like end section 3 of the sensor mounting 1. Accordingly, the sensor 11 or its housing 12 comprises second retaining means 15 which are designed corresponding to the first retaining means 5. The retaining means 15 are designed as a permanent magnet. The retaining means 5 comprise a soft magnetic material. This prevents the accumulation of metal parts on the sensor mounting 1. The sensor 11 can be cleaned more easily than the sensor mounting 1. The reverse arrangement is possible in principle. In one embodiment, the sensor 11 is held in the sensor mounting 1 only by means of a frictional connection. For this purpose, the sensor 11 or the sensor mounting 1 can have a certain material combination so that the sensor 11 cannot simply slide out of the sensor mounting.

This results in an intrinsically sealed sensor arrangement. Even without the sensor 11 installed, the sensor mounting 1 is sealed towards the medium, and liquid cannot penetrate into the sensor mounting 1.

Additionally or alternatively, the retaining means 5 may comprise a cutoff device which is arranged in the region of the open end of the pot-like end section 3. The retaining means 5 comprise, for example, a hinge; coupling, such as a clamp coupling; lever; or bayonet. A clamp coupling includes a slotted ring against which a conical element presses.

Surfaces and edges of the sensor 11 which can be brought into contact with the medium have a smooth and rounded design. The sensor 11 is free of backsplashes and dead spaces so that no dirt accumulates.

The housing 2 of the sensor mounting 1 comprises first communication means 4 via which the sensor mounting 1 can communicate with the sensor 11. For this purpose, the sensor 11 comprises appropriate second communication means 14 corresponding thereto. The first and second communication means 4, 14 are designed as inductive, capacitive, or optical interfaces, for example. FIGS. 2 and 3 show the embodiment with inductive interfaces, i.e., with coils. FIG. 4 shows the embodiment with capacitive interfaces, i.e., with capacitors. Via the first and second communication means 4, 14, power is transmitted wirelessly from the sensor arrangement 1 to the sensor 11 and also for the wireless transmission and reception of data between the sensor arrangement 1 and the sensor 11.

FIG. 2 shows an embodiment in which the communication means 4, 14 are each designed as cylinder coils. Other coil shapes such as a toroidal coil are possible. In FIG. 2, the second communication means 14 form the "inner" coil pair while the first communication means 4 form the "outer" coil pair. The outer coil pair encompasses the inner coil pair.

FIG. 3 shows a further embodiment. In this instance, the communication means 4, 14 are respectively arranged on the front face of the sensor 11 or of the sensor arrangement 1.

A data processing unit 7, for instance a microcontroller with a memory, is arranged in the housing 2 of the sensor mounting 1. The data processing unit 7 processes data, for example the measured values of a connected sensor 11. The data are processed, calculated, in some instances converted, and sent to the superordinate unit. The data exchange with the sensor 1 is organized via the data processing unit 7. Depending on the embodiment, i.e., depending on the microcontroller, CPU, memory etc., the data processing unit 7 performs tasks of a transmitter. In one embodiment, the data processing unit 7 comprises a wireless module, such as a Bluetooth, NFC, Wifi (in accordance with the IEEE 802.11 standards), or infrared module. In one embodiment, the data processing unit 17 of the sensor also comprises a wireless module, such as a Bluetooth, NFC, Wifi (in accordance with the IEEE 802.11 standards), or infrared module. The respective wireless modules can also be offset from the data processing units 7, 17 and be arranged as a separate module. The communication means 4 are connected to the connecting means 6, where applicable via the data processing unit 7. The communication means 14 of the sensor 11 are connected to the connecting means 16, where applicable via the data processing unit 17. In one embodiment, sensor 11 and sensor mounting 1 communicate via the respective wireless modules. In this instance, these wireless modules can be regarded as communication means 4, 14.

The invention claimed is:

1. A sensor mounting comprising:
   a housing having an end section, wherein the end section is designed for mounting a sensor;
   first communication capabilities arranged in the housing;
   wherein the first communication capabilities are designed as an inductive, capacitive, or optical interface; and
   wherein the first communication capabilities are designed for the wireless transmission of power to the sensor and for the wireless transmission and reception of data to and from the sensor;
   first retaining capabilities that are designed to hold the sensor in the end section; and
   connecting capabilities which are connected at least to the first communication capabilities and are designed to connect the sensor mounting to a superordinate unit;
   wherein the sensor mounting is sealed toward the medium;
   wherein, in an operating condition, the sensor and sensor mounting are immersed in the medium to be measured.

2. The sensor mounting according to claim 1, wherein the connecting capabilities are arranged at least in sections in the housing.

3. The sensor mounting according to claim 1, wherein the connecting capabilities are designed as cables and are fixed components of the sensor mounting.

4. The sensor mounting according to claim 1, wherein the first retaining capabilities are arranged in the housing.

5. The sensor mounting according to claim 1, wherein the first retaining capabilities are designed as a permanent magnet.

6. The sensor mounting according to claim 1, wherein the first retaining capabilities comprise a cutoff device, hinge, coupling, lever, or bayonet, which is arranged in a region of an open end of the end section.

7. The sensor mounting according to claim 1, further comprising a first data processing unit, including a microcontroller and a memory, wherein the data processing unit is arranged in the housing and is designed to process the data of a connected sensor and to transmit the data to the superordinate unit, and to receive and process data from the superordinate unit.

8. The sensor mounting according to claim 1, further comprising a wireless module, wherein the wireless module is arranged in the housing and is designed for communication with an operating device.

9. The sensor mounting according to claim 7, wherein the first data processing unit is designed to process sensor mounting-specific, measuring point-specific, or sensor-specific data.

10. The sensor mounting according to claim 1, further comprising a fastening fixture with which the sensor mounting is fastened.

11. The sensor mounting according to claim 1, further comprising at least one first indicator device, wherein the first indicator device is designed to indicate a state of the sensor mounting, a connected sensor, a connection of sensor and sensor mounting, a measured value of a connected sensor.

12. The sensor mounting of claim 1, wherein surfaces and edges of the housing which can be brought into contact with a medium have a smooth and rounded design.

13. The sensor mounting according to claim 1, wherein the housing is designed as a single part.

14. The sensor mounting according to claim 1, wherein an inner diameter of the end section is at least 12 mm.

15. An assembly arrangement, comprising:
   a sensor mounting including:
      a housing having an end section, wherein the end section is designed for mounting a sensor;
         first communication capabilities arranged in the housing;
         wherein the first communication capabilities are designed as an inductive, capacitive, or optical interface; and
         wherein the first communication capabilities are designed for the wireless transmission of power to the sensor and for the wireless transmission and reception of data to and from the sensor;
         first retaining capabilities that are designed to hold the sensor in the end section; and
         connecting capabilities which are connected at least to the communication capabilities and are designed to connect the sensor mounting to a superordinate unit; and
   a sensor including:
      the housing;
      second retaining capabilities which are designed to be complementary to the first retaining capabilities and which hold the sensor in an end section of a sensor mounting;

second communication capabilities which are arranged in the sensor mounting and are designed to be complementary to the first communication capabilities;

wherein the second communication capabilities are designed for the wireless reception of power from the sensor mounting and for the wireless transmission and reception of data from and to the sensor mounting;

at least one sensor element for the measurement of at least one measured variable; and a second data processing unit arranged in the sensor housing;

wherein the second data processing unit is at least designed to send a value dependent on the measured variable via the second communication capabilities, or to receive data;

wherein the sensor mounting is sealed toward the medium;

wherein, in an operating condition, the sensor and sensor mounting are immersed in the medium to be measured.

16. The assembly arrangement according to claim 15, wherein surfaces and edges of the sensor which can be brought into contact with a medium have a smooth and rounded design.

17. The assembly arrangement according to claim 15, wherein the second retaining capabilities are arranged in the sensor housing.

18. The assembly arrangement according to claim 15, wherein the sensor further comprises at least one second indicator device, wherein the second indicator device is designed to indicate a state of a connected sensor mounting, of the sensor, of a connection between the sensor and the sensor mounting, or of a measured value.

19. The assembly arrangement according to claim 15, wherein the sensor further comprises a wireless module.

20. The assembly arrangement according to claim 15, wherein the sensor element is designed for measuring oxygen, pH value, or conductivity.

* * * * *